(12) United States Patent
Wu et al.

(10) Patent No.: US 11,798,153 B2
(45) Date of Patent: Oct. 24, 2023

(54) FREQUENCY DOMAIN ENHANCEMENT OF LOW-SNR FLAT RESIDUE/STAIN DEFECTS FOR EFFECTIVE DETECTION

(71) Applicant: KLA Corporation, Milpitas, CA (US)

(72) Inventors: Chaohong Wu, Fremont, CA (US); Yong Zhang, Cupertino, CA (US)

(73) Assignee: KLA Corporation, Milpitas, CA (US)

( * ) Notice: Subject to any disclaimer, the term of this patent is extended or adjusted under 35 U.S.C. 154(b) by 670 days.

(21) Appl. No.: 17/016,042

(22) Filed: Sep. 9, 2020

(65) Prior Publication Data
US 2021/0104034 A1  Apr. 8, 2021

Related U.S. Application Data

(60) Provisional application No. 62/909,582, filed on Oct. 2, 2019.

(51) Int. Cl.
*G06T 7/00* (2017.01)
*G06T 7/37* (2017.01)

(52) U.S. Cl.
CPC ............. *G06T 7/0004* (2013.01); *G06T 7/37* (2017.01); *G06T 2207/30148* (2013.01)

(58) Field of Classification Search
CPC .... G06V 9/6282; G06V 10/98; G06V 9/6254; G01N 21/956007; G01N 21/9501; G06K 9/6282
See application file for complete search history.

(56) References Cited

U.S. PATENT DOCUMENTS

| 5,046,112 | A | | 9/1991 | Chang et al. |
| 6,084,664 | A | * | 7/2000 | Matsumoto ...... G01N 21/95607 356/239.8 |
| 6,630,996 | B2 | * | 10/2003 | Rao ..................... G01N 21/9501 356/237.4 |

(Continued)

FOREIGN PATENT DOCUMENTS

KR  1020010053397 A  6/2001

OTHER PUBLICATIONS

Rafael C. Gonzalez and Richard E. Woods, Digital Image Processing, Pearson Prentice Hall, 2008, p. 173.

(Continued)

*Primary Examiner* — Yosef Kassa
(74) *Attorney, Agent, or Firm* — Suiter Swantz pc llo

(57) ABSTRACT

An inspection system is disclosed. The system includes a controller communicatively couplable with an inspection sub-system configured to receive illumination from a sample and generate image data. The controller includes one or more processors configured to execute program instructions causing the one or more processors to receive the image data, wherein the image data comprises at least one image, downsample the at least one image using bicubic interpolation or bilinear interpolation, transform the at least one image from a spatial domain to a frequency domain using a Fourier transform, filter frequencies higher than a threshold frequency from the at least one image, transform the at least one image from the frequency domain to the spatial domain using an inverse Fourier transform, and detect one or more flat-pattern defects in the at least one image.

20 Claims, 7 Drawing Sheets

(56) References Cited

U.S. PATENT DOCUMENTS

| | | | |
|---|---|---|---|
| 6,894,302 B2* | 5/2005 | Ishimaru | G01N 21/88 |
| | | | 250/559.46 |
| 7,206,737 B2* | 4/2007 | Seto | G06F 3/03545 |
| | | | 704/8 |
| 7,280,200 B2* | 10/2007 | Plemmons | G01N 21/9503 |
| | | | 356/237.3 |
| 8,811,712 B2* | 8/2014 | Maeda | G06T 7/001 |
| | | | 382/141 |
| 2010/0310130 A1 | 12/2010 | Beghuin et al. | |
| 2017/0074810 A1 | 3/2017 | Adler et al. | |
| 2017/0191945 A1 | 7/2017 | Zhang et al. | |

OTHER PUBLICATIONS

PCT International Search Report and Written Opinion for International Application No. PCT/US2020/05363 dated Jan. 15, 2021, 8 pages.

* cited by examiner

FREQUENCY DOMAIN ENHANCEMENT OF LOW-SNR FLAT RESIDUE/STAIN DEFECTS FOR EFFECTIVE DETECTION

CROSS-REFERENCE TO RELATED APPLICATION

The present application claims the benefit under 35 U.S.C. § 119(e) of U.S. Provisional Application Ser. No. 62/909,582 filed Oct. 2, 2019, entitled FREQUENCY DOMAIN ENHANCEMENT OF LOW-SNR FLAT RESIDUES/STAINS DEFECT FOR EFFECTIVE DETECTION, naming Chaohong Wu and Yong Zhang as inventors, which is incorporated herein by reference in the entirety.

TECHNICAL FIELD

The present disclosure generally relates to the detection of defects in semiconductor wafers and photomasks, and, in particular, the detection of large-sized residue and stain defects on wafer dies.

BACKGROUND

In a conventional system used to detect defects on a sample (e.g., a semiconductor wafer or photomask), an illumination source illuminates the sample and a detector (e.g., a camera) receives illumination that is reflected or scattered from the sample. The detector generates image data, and the image data is then transmitted to a computer system. The image data is then used to detect defects on the sample using an inspection algorithm.

A conventional inspection algorithm finds the intensity difference at each pixel level between a target die image and a reference die image. The pixel level difference is compared to a threshold generated based on noise statistics between the target die image and the reference die image. The conventional inspection algorithm is sufficient at detecting defects having a size at the resolution level, at a signal level above the background noise, and with pattern structures.

However, defects such as remains or stains (i.e., flat pattern defects) that are scattered in a noisy background and visible at the image level are difficult to detect with a conventional algorithm. When analyzing flat pattern defects, the pixel level difference is usually buried in the noise floor, which increases the detection difficulty without introducing a large number of nuisances (e.g., areas of noise that appear to be defects, but are actually not defects). Furthermore, it is difficult to detect defects with a low nuisance rate in wafer images with straight line patterns or wave line patterns, especially with conventional single-die techniques. Thus, it is desirable to improve the detection of flat pattern defects by removing undesirable noise or nuisances.

SUMMARY

An inspection system is disclosed in accordance with one or more illustrative embodiments of the present disclosure. In one illustrative embodiment, the inspection system comprises a controller communicatively couplable with one or more inspection sub-systems configured to receive illumination from a sample and generate image data. The controller includes one or more processors configured to execute program instructions causing the one or more processors to: receive the image data, wherein the image data comprises at least one image; downsample the at least one image using bicubic interpolation or bilinear interpolation; transform the at least one image from a spatial domain to a frequency domain using a Fourier transform; filter frequencies higher than a threshold frequency from the at least one image; transform the at least one image from the frequency domain to the spatial domain using an inverse Fourier transform; and detect one or more flat-pattern defects in the at least one image.

An inspection system is disclosed in accordance with one or more illustrative embodiments of the present disclosure. In one illustrative embodiment, the inspection system comprises an inspection sub-system configured to receive illumination from a sample and generate image data. In another illustrative embodiment, the inspection system comprises a controller communicatively couplable with the inspection sub-system. The controller includes one or more processors configured to execute program instructions causing the one or more processors to: receive the image data, wherein the image data comprises at least one image; downsample the at least one image using bicubic interpolation or bilinear interpolation; transform the at least one image from a spatial domain to a frequency domain using a Fourier transform; filter frequencies higher than a threshold frequency from the at least one image; transform the at least one image from the frequency domain to the spatial domain using an inverse Fourier transform; and detect one or more flat-pattern defects in the at least one image.

An inspection method is disclosed in accordance with one or more illustrative embodiments of the present disclosure. In one illustrative embodiment, the inspection method comprises receiving illumination from a sample and generating image data using an inspection sub-system; receiving the image data, wherein the image data comprises at least one image; downsampling the at least one image using bicubic interpolation or bilinear interpolation; transforming the at least one image from a spatial domain to a frequency domain using a Fourier transform; filtering frequencies higher than a threshold frequency from the at least one image; transforming the at least one image from the frequency domain to the spatial domain using an inverse Fourier transform; and detecting one or more flat-pattern defects in the at least one image.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1:
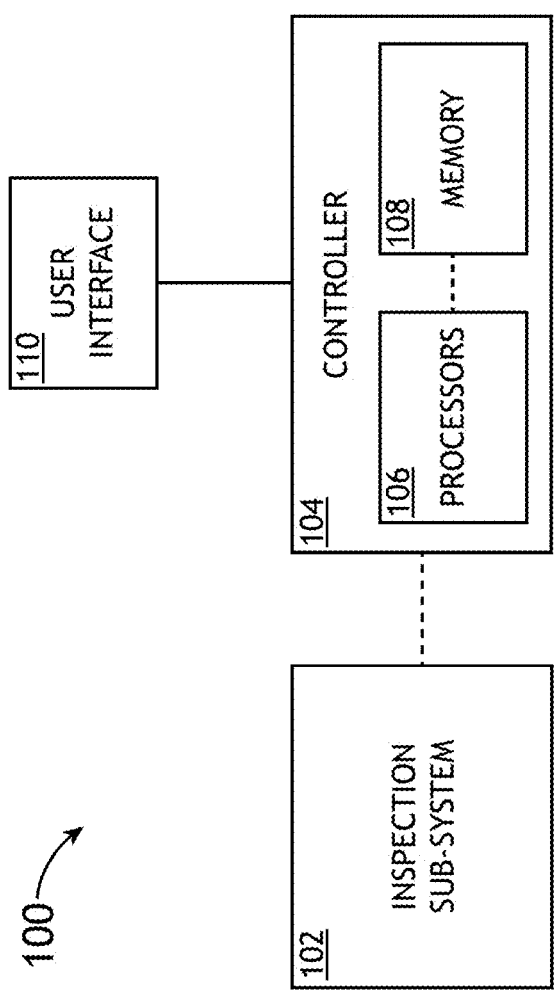
FIG. 1 is a block diagram illustrating an inspection system for collecting an image of a sample, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to an inspection system and method. The inspection system may be configured to detect one or more defects on a sample (e.g., a semiconductor wafer or a photomask). The system may entail illuminating the sample with photons or electrons, and receiving illumination (e.g., photons or electrons reflected and/or scattered from the sample) at one or more detectors to generate image data.

The image data may be transmitted to a controller (e.g., an image server). The image data may comprise a plurality of images (i.e., frames), where each image corresponds to a die on a wafer. One or more inspection algorithms may be employed to detect defects in the plurality of images. In some embodiments, an algorithm may detect defects by analyzing one die image at a time (e.g., a single-die detection algorithm), without comparing the die image to a reference die image. In other embodiments, a test die image may be compared to a reference die image to produce a difference image. The reference image serves as an ideal or error-free image such that when the test image is subtracted from the reference image, the difference image indicates a problematic structure (i.e., a defect). After a defect is detected, a corrective action may be performed (e.g., by altering the design or processing of a wafer).

In particular, embodiments of the present disclosure are directed to the detection of relatively large flat remain defects, residue defects, and stain defects (in other words, flat pattern defects). The flat pattern defects may be formed during a full-flow process on a semiconductor wafer (e.g., after the photoresist and development stages), and may be visually discernable. However, images of the flat pattern defects may have a low intensity at each pixel level.

Major characteristics of the flat pattern defects may include: (1) defect pixels forming irregular shapes with relatively large areas, (2) gray-levels of the pixels of the relatively large shapes being close to the gray-levels of neighboring pixels, (3) pixels of the same group separated by background pixels, and (4) being difficult to detect with traditional pixel intensity-based inspection algorithms without introducing nuisances (since it is not possible for a single-die detection algorithm to single out embedded signals from negligible neighboring non-repeated cell-structure pixels).

Embodiments of the present disclosure may enable the detection of flat pattern defects in a single-die detection mode and a die-to-die difference detection mode with a low nuisance rate. An inspection algorithm may first reduce an image resolution to smooth out or weaken isolated tiny defect pixels and agglomerate scattered remain defects. The inspection algorithm may then utilize a frequency-domain low-pass filter (LPF) to filter out high-frequency repeated pattern noises. The inspection algorithm may enhance the pixel-level low-signal-to-noise-ratio (SNR) signals of flat pattern defects to increase the sensitivity of conventional algorithms (e.g., after the enhancement).

FIG. 1 illustrates an inspection system 100, in accordance with one or more embodiments of the present disclosure. In particular, FIG. 1 illustrates a system 100 for identifying defects on a surface of a sample (e.g., a semiconductor wafer, photomask, or reticle). The system 100 may additionally include a controller 104 including one or more processors 106 and a memory medium 108, and a user interface 110.

The inspection system sub-system 102 may include, but is not limited to, an optical-based inspection system, a charged particle-based inspection system, and the like. For instance, the inspection sub-system 102 may include a broadband inspection sub-system (e.g., broadband plasma inspection sub-system) or a narrowband inspection sub-system (e.g., laser-based inspection system). In another instance, the inspection sub-system 102 may include a scanning electron microscopy (SEM) inspection sub-system.

In one embodiment, the controller 104 is communicatively coupled to the one or more characterization sub-systems 102. The one or more processors 106 of the controller 104 may be configured to generate one or more control signals configured to adjust one or more characteristics of the inspection sub-system 102. For example, the controller 104 may be configured to adjust the height of a stage holding a sample or a wavelength of light.

In one embodiment, the controller 104 is configured to receive one or more images (e.g., image data) of a sample. For example, the image data may comprise a plurality of images (i.e., frames). Each of the frames may correspond to a die on a sample (e.g., if the sample is a wafer). The controller 104 may be configured to determine one or more features of the sample indicative of one or more defects of the sample. In another embodiment, the controller 104 may be configured to receive one or more target images of one or more target features of a target sample.

Figure 2A:
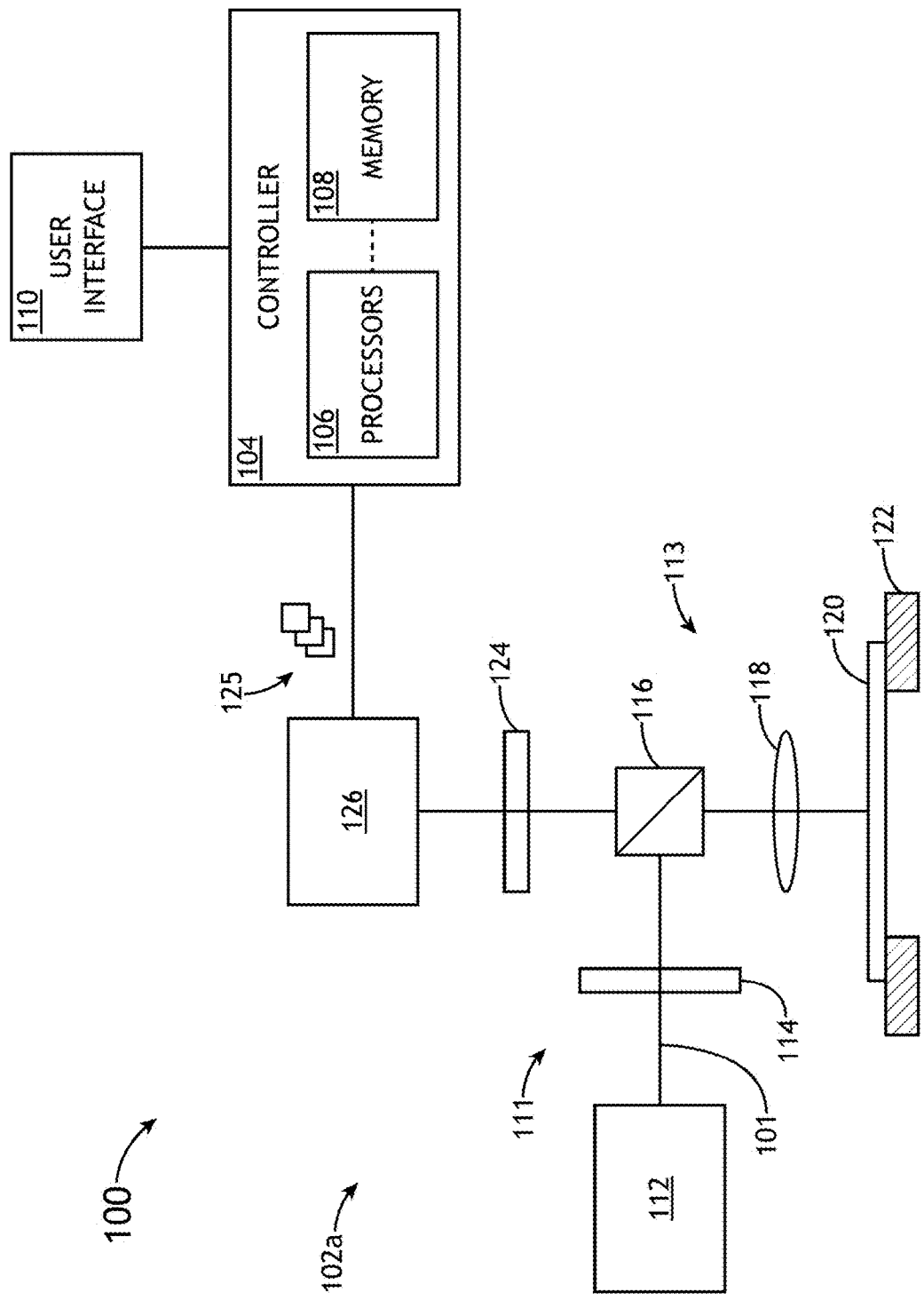
FIG. 2A illustrates the inspection system including an optical-based inspection sub-system, in accordance with one or more embodiments of the present disclosure.

FIG. 2A illustrates a simplified schematic view of the system 100 for characterizing a sample, in accordance with one or more embodiments of the present disclosure. In particular, the system 100 as depicted in FIG. 2A includes an optical inspection sub-system 102 such that system 100 operates as an optical inspection system.

The optical inspection sub-system 102a may include any optical-based inspection known in the art. For example, the inspection sub-system 102a may include an optical dark-field inspection tool. The optical inspection sub-system 102a may include, but is not limited to, an illumination source 112, an illumination arm 111, a collection arm 113, and a detector assembly 126.

In one embodiment, optical inspection sub-system 102a is configured to inspect and/or measure the sample 120 disposed on the stage assembly 122. The illumination source 112 may include any illumination source known in the art for generating illumination 101 including, but not limited to, a broadband radiation source. In another embodiment, optical inspection sub-system 102a may include an illumination arm 111 configured to direct illumination 101 to the sample 120. It is noted that illumination source 112 of the optical inspection sub-system 102a may be configured in any orientation known in the art including, but not limited to, a dark-field orientation, a light-field orientation, etc. For example, one or more optical elements 114, 124 may be selectably adjusted in order to configure the inspection sub-system 102a in a dark-field orientation, a bright-field orientation, etc.

The sample 120 may include any sample known in the art including, but not limited to, a wafer, a reticle, a photomask, etc. In one embodiment, the sample 120 is disposed on a stage assembly 122 to facilitate movement of the sample 120. In another embodiment, the stage assembly 122 is an actuatable stage. For example, the stage assembly 122 may include, but is not limited to, one or more translational stages suitable for selectably translating the sample 120 along one or more linear directions (e.g., x-direction, y-direction and/or z-direction). By way of another example, the stage assembly 122 may include, but is not limited to, one or more rotational stages suitable for selectively rotating the sample 120 along a rotational direction. By way of another example, the stage assembly 122 may include, but is not limited to, a rotational stage and a translational stage suitable for selectably translating the sample 120 along a linear direction and/or rotating the sample 120 along a rotational direction. It is noted herein that the system 100 may operate in any scanning mode known in the art.

The illumination arm 111 may include any number and type of optical components known in the art. In one embodiment, the illumination arm 111 includes one or more optical elements 114, a beam splitter 116, and an objective lens 118. In this regard, illumination arm 111 may be configured to focus illumination 101 from the illumination source 112 onto the surface of the sample 120. The one or more optical elements 114 may include any optical element known in the art including, but not limited to, one or more mirrors, one or more lenses, one or more polarizers, one or more beam splitters, wave plates, one or more apodizers, and the like.

In another embodiment, optical inspection sub-system 102a includes a collection arm 113 configured to collect illumination reflected or scattered from sample 120. In another embodiment, collection arm 113 may direct and/or focus the reflected and scattered light to one or more sensors of a detector assembly 126 via one or more optical elements 124. The one or more optical elements 124 may include any optical elements known in the art including, but not limited to, one or more mirrors, one or more lenses, one or more polarizers, one or more beam splitters, wave plates, and the like. It is noted that detector assembly 126 may include any sensor and detector assembly known in the art for detecting illumination reflected or scattered from the sample 120.

In another embodiment, the detector assembly 126 of the optical inspection sub-system 102 is configured to collect inspection data of the sample 120 based on illumination reflected or scattered from the sample 120. In another embodiment, the detector assembly 126 is configured to transmit collected/acquired images and/or inspection data to the controller 104.

Figure 2B:
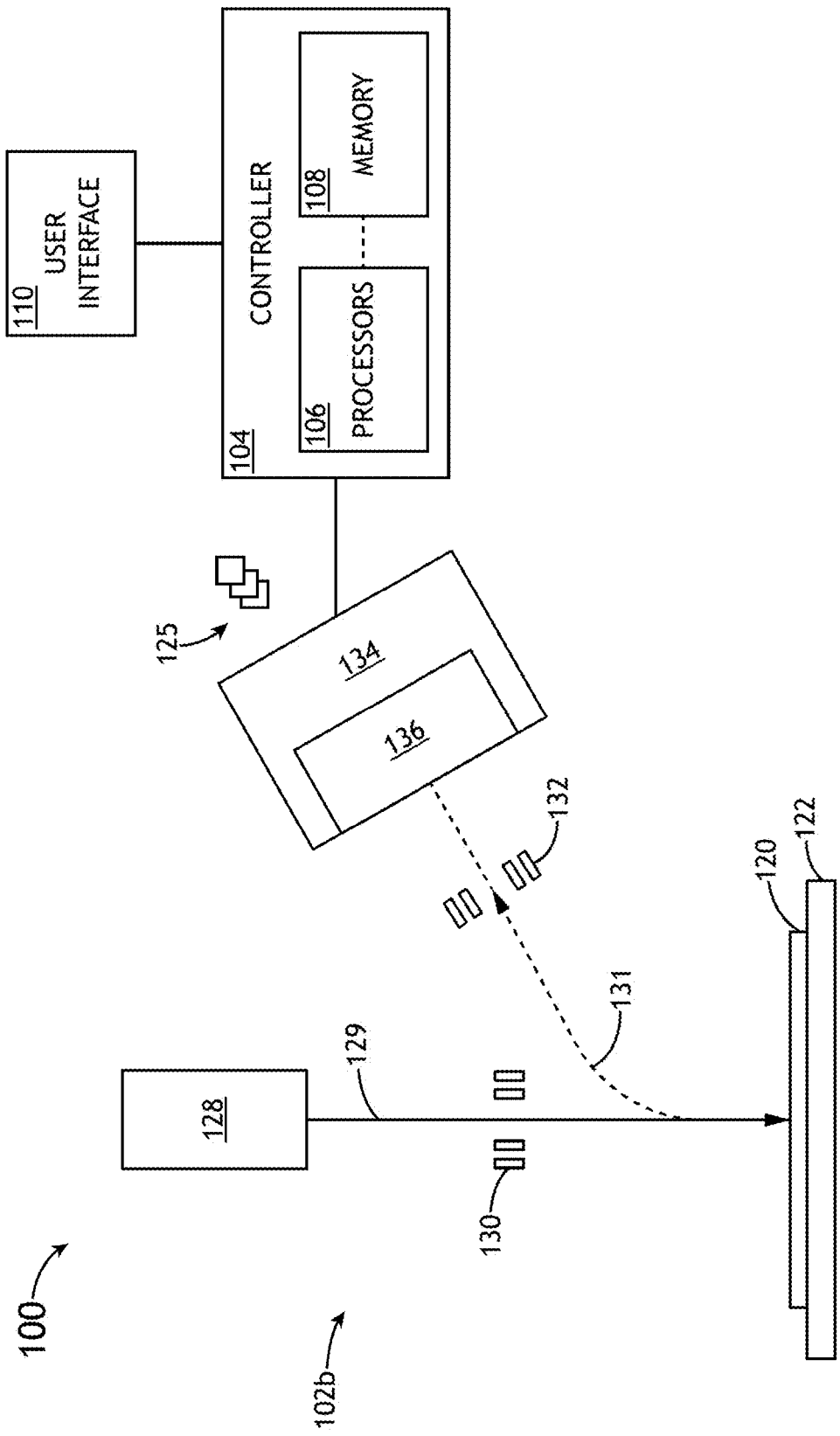
FIG. 2B illustrates the inspection system including an electron-based inspection sub-system, in accordance with one or more embodiments of the present disclosure.

FIG. 2B illustrates a simplified schematic view of the system 100 for characterizing a sample 120, in accordance with one or more embodiments of the present disclosure. In particular, the system 100 as depicted in FIG. 2B, includes an electron-based sub-system 102b such that system 100 operates as electron-based inspection system (e.g., a scanning electron microscopy (SEM) system).

In one embodiment, the electron-based inspection sub-system 102b is configured to perform one or more measurements on the sample 120. In this regard, the electron-based inspection sub-system 102b may be configured to acquire one or more images of the sample 120. The electron-based inspection sub-system 102b may include, but is not limited to, an electron beam source 128, one or more electron-optical elements 130, one or more electron-optical elements 132, and an electron detector assembly 134 including one or more electron sensors 136.

In one embodiment, the electron beam source 128 is configured to direct one or more electron beams 129 to the sample 120. The electron beam source 128 may form an electron-optical column. In another embodiment, electron beam source 128 includes one or more additional and/or alternative electron-optical elements 130 configured to focus and/or direct the one or more electron beams 129 to the surface of the sample 120. In another embodiment, electron-based inspection sub-system 102b includes one or more electron-optical elements 132 configured to collect secondary and/or backscattered electrons 131 emanated from the surface of the sample 120 in response to the one or more electron beams 129. It is noted herein that the one or more electron-optical elements 130 and the one or more electron-optical elements 132 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the electron-based inspection sub-system 102b is not limited to the electron-optical elements depicted in FIG. 2B, which are provided merely for illustrative purposes. It is further noted that the system 100 may include any number and type of electron-optical elements necessary to direct/focus the one or more electron beams 129 onto the sample 120 and, in response, collect and image the emanated secondary and/or backscattered electrons 131 onto the electron detector assembly 134.

For example, the system 100 may include one or more electron beam scanning elements (not shown). For instance, the one or more electron beam scanning elements may include, but are not limited to, one or more electromagnetic scanning coils or electrostatic deflectors suitable for controlling a position of the one or more electron beams 129 relative to the surface of the sample 120. Further, the one or more scanning elements may be utilized to scan the one or more electron beams 129 across the sample 120 in a selected pattern.

In another embodiment, secondary and/or backscattered electrons 131 are directed to one or more sensors 136 of the electron detector assembly 134. The electron detector assembly 134 of the electron-based inspection sub-system 102 may include any electron detector assembly known in the art suitable for detecting backscattered and/or secondary electrons 131 emanating from the surface of the sample 120. In one embodiment, the electron detector assembly 134 includes an electron detector array. In this regard, the electron detector assembly 134 may include an array of electron-detecting portions. Further, each electron-detecting portion of the detector array of the electron detector assembly 134 may be positioned to detect an electron signal from sample 120 associated with one of the incident electron beams 129. The electron detector assembly 134 may include any type of electron detector known in the art. For example, the electron detector assembly 134 may include a microchannel plate (MCP), a PIN or p-n junction detector array, such as, but not limited to, a diode array or avalanche photo diodes (APDs). By way of another example, the electron detector assembly 134 may include a high-speed scintillator or a photomultiplier tube (PMT) detector.

While FIG. 2B illustrates the electron-based inspection sub-system 102b as including an electron detector assembly 134 comprising only a secondary electron detector assembly, this is not to be regarded as a limitation of the present disclosure. In this regard, it is noted that the electron detector assembly 134 may include, but is not limited to, a secondary electron detector, a backscattered electron detector, and/or a primary electron detector (e.g., an in-column electron detector). In another embodiment, electron-based inspection sub-system 102 may include a plurality of electron detector assemblies 134. For example, system 100 may include a secondary electron detector assembly, a backscattered electron detector assembly, and an in-column electron detector assembly.

In another embodiment, as described previously herein, the system 100 includes a user interface 110 communicatively coupled to the controller 104. In another embodiment, the user interface 110 includes a user input device and a display. The user input device of the user interface 110 may be configured to receive one or more input commands from a user, the one or more input commands configured to input data into system 100 and/or adjust one or more characteristics of system 100. In another embodiment, the display of the user interface 110 may be configured to display data of system 100 to a user.

In another embodiment, the one or more processors 106 may be communicatively coupled to the memory medium 108, wherein the one or more processors 106 are configured to execute program instructions maintained on the memory medium 108. In this regard, the one or more processors 106 of the controller 104 may execute any of the various process steps described throughout the present disclosure. Further, the controller 104 may be configured to receive data including, but not limited to, imagery data associated with the sample 120.

The controller 104 may be communicatively coupled to the inspection system 102a or 102b. The controller 104 may be configured to receive the image data 125 from the inspection sub-system 102a or 102b and detect one or more defects on the sample 120 using the image data 125.

It is noted herein that the one or more components of system 100 may be communicatively coupled to the various other components of system 100 in any manner known in the art. For example, the one or more processors 106 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 104 may be communicatively coupled to one or more components of the inspection sub-system 102 via any wireline or wireless connection known in the art.

The one or more processors 106 of the controller 104 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 106 may include any device configured to execute algorithms and/or instructions (e.g., program instructions stored in memory). In one embodiment, the one or more processors 106 may be embodied as a desktop computer, mainframe computer system, workstation, image computer, parallel processor, networked computer, or any other computer system configured to execute a program configured to operate or operate in conjunction with the system 100, as described throughout the present disclosure.

Moreover, different sub-systems of the system 100 (e.g., illumination source 112, electron beam source 128, detector assembly 126, electron detector assembly 134, controller 104, user interface 110, and the like) may include processor or logic elements suitable for carrying out at least a portion of the steps described throughout the present disclosure. Therefore, the above description should not be interpreted as a limitation on the present disclosure but merely an illustration. Further, the steps described throughout the present disclosure may be carried out by a single controller 104 or, alternatively, multiple controllers 104. Additionally, the controller 104 may include one or more controllers housed in a common housing or within multiple housings. In this way, any controller or combination of controllers may be separately packaged as a module suitable for integration into the inspection system 100.

The memory medium 108 may include any storage medium known in the art suitable for storing program instructions executable by the associated one or more processors 106. For example, the memory medium 108 may include a non-transitory memory medium. By way of another example, the memory medium 108 may include, but is not limited to, a read-only memory (ROM), a random-access memory (RAM), a magnetic or optical memory device (e.g., disk), a magnetic tape, a solid-state drive and the like. It is further noted that the memory medium 108 may be housed in a common controller housing with the one or more processors 106. In one embodiment, the memory medium 108 may be located remotely with respect to the physical location of the one or more processors 106 and the controller 104. For instance, the one or more processors 106 of the controller 104 may access a remote memory (e.g., server), accessible through a network (e.g., internet, intranet and the like).

In one embodiment, a user interface 110 is communicatively coupled to the controller 104. In one embodiment, the user interface 110 may include, but is not limited to, one or more desktops, laptops, tablets, and the like. In another embodiment, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110

In another embodiment, the controller 104 is communicatively coupled to one or more elements of the inspection system 100. In this regard, the controller 104 may transmit and/or receive data from any component of the inspection system 100. Further, the controller 104 may direct or otherwise control any component of the inspection system 100 by generating one or more drive signals for the associated components. For example, the controller 130 may be communicatively coupled to the detector 126 to receive one or more images from the detector 126.

Figure 3:
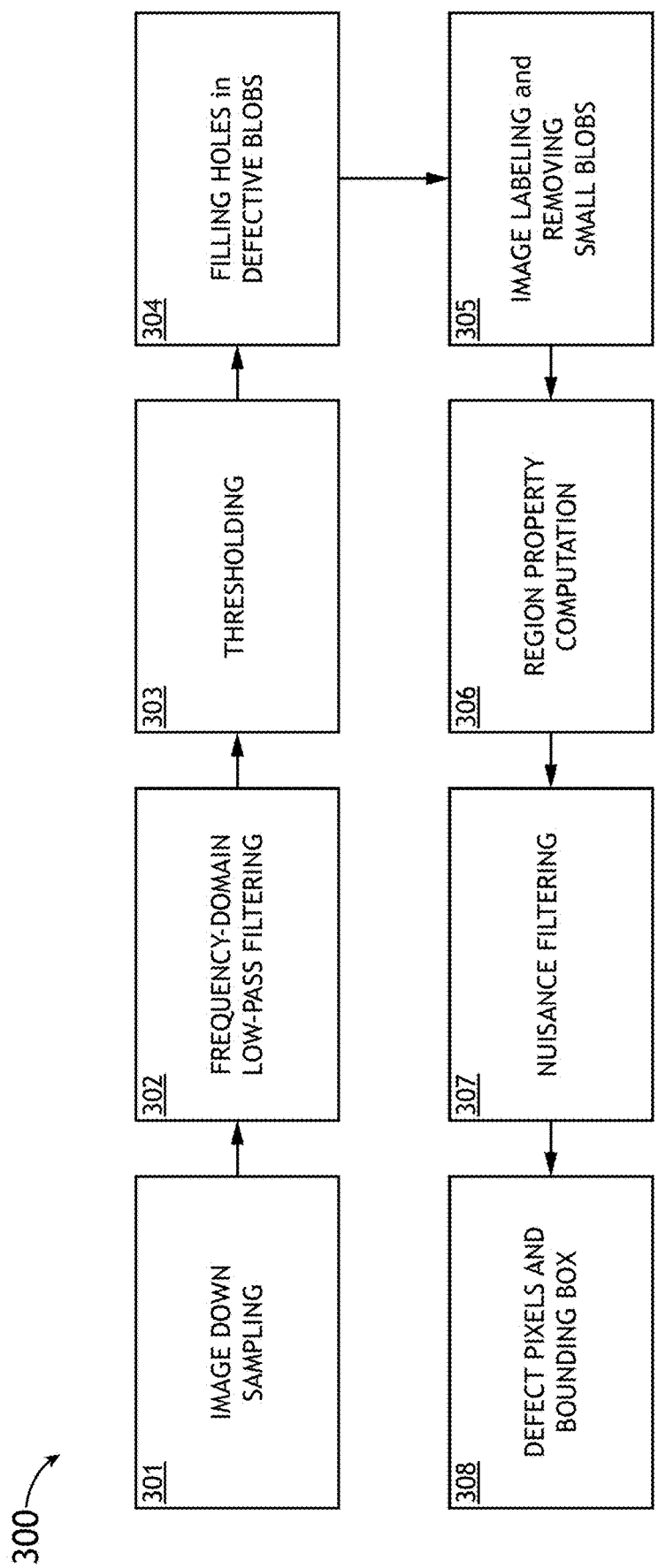
FIG. 3 is a flowchart illustrating a method of detecting flat pattern defects, in accordance with one or more embodiments of the present disclosure.

FIG. 3 is a flowchart illustrating a method 300 of detecting flat pattern defects in an image, in accordance with one or more embodiments of the present disclosure. The method 300 is flexible and may be applied to similar types of defects (e.g., flat pattern defects) using different wafer inspection systems. The method 300 may enable the detection of relatively large low-signal flat residue defects in an image with a noisy background. This noisy background may be present in a raw image (e.g., a bare wafer image, before any processing steps) or a difference image (e.g., a patterned wafer image, after processing steps).

As shown in FIG. 3, the method may comprise several related sequential image processing procedures. In step 301, an image may be downsampled (e.g., by bicubic or bilinear interpolation) to reduce high frequency noise. Downsampling may comprise the aggregation of large sized signals from a noisy background and the reduction of the dimension of the image. In step 302, a low-pass filter (LPF) in the frequency domain may filter out high-frequency noises. In step 303, adaptive thresholding may be employed to obtain defect candidates and may be combined with nuisance filtering to identify image blobs.

Referring to step 302, the LPF in frequency domain may comprise several steps. A forward Fourier transformation may be applied to transform the original image from the spatial domain to a signal in the frequency domain. A frequency response may shift to a centralized response for sequential filtering. Low frequency signals may be retained and high frequency signals may be eliminated (e.g, high frequency signals higher than a threshold frequency may be filtered out). Then, a centralized image frequency signal may be multiplied with a filter kernel. The central part of the signal in the frequency domain may be retained with a gradual change of the cutoff frequency boundary. A Butterworth filter function or a Gaussian filter function may be utilized as a boundary transform function to prevent blurring and ringing artifacts by an ideal LPF. The nth order of the Butterworth function is defined as:

$$\frac{1}{1+\left[\frac{D(u,v)}{D_0(u,v)}\right]^{2n}}$$

where $D(u, v)$ is the distance between a point $(u, v)$ in the frequency domain and the center of the frequency rectangle, and $D_0(u, v)$ is a cutoff frequency from the origin. An example of the Butterworth filter function is shown and described in Rafael C. Gonzalez and Richard E. Woods, Digital Image Processing, Pearson Prentice Hall, 2008, p. 173, which is incorporated herein by reference in its entirety. Finally, the real part from an inverse Fourier transformation of the modulated frequency response is retrieved as an enhanced image. Shape features of defects of interest (DOIs) may reduce nuisances in single-die and die-to-die detection modes. In the single-die mode, the major axis and minor axis of a fitting ellipse may be computed, and the ratio of the two features may be used to eliminate line wave nuisances. In the die-to-die mode, color nuisances due to pixel shrinking and LPF filtering may resemble real DOIs. However, common color nuisances may possess regular boundaries, which may be used to discriminate color nuisances from true defects.

Figure 4A:
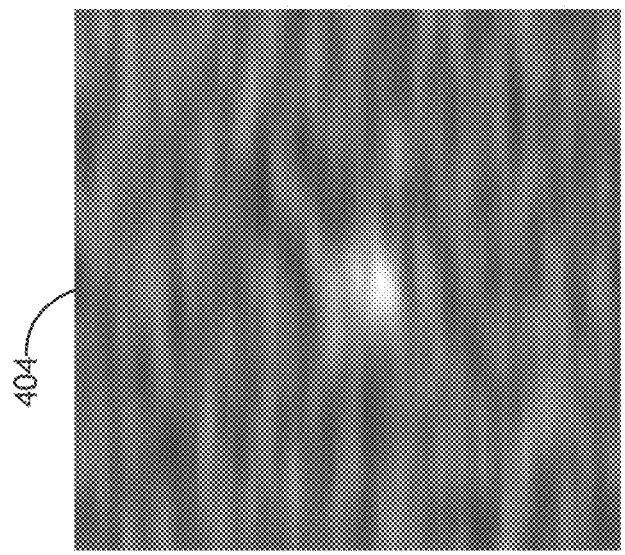
FIG. 4A illustrates the enhancement of pixels associated with a defect, in accordance with one or more embodiments of the present disclosure.
Figure 4A:
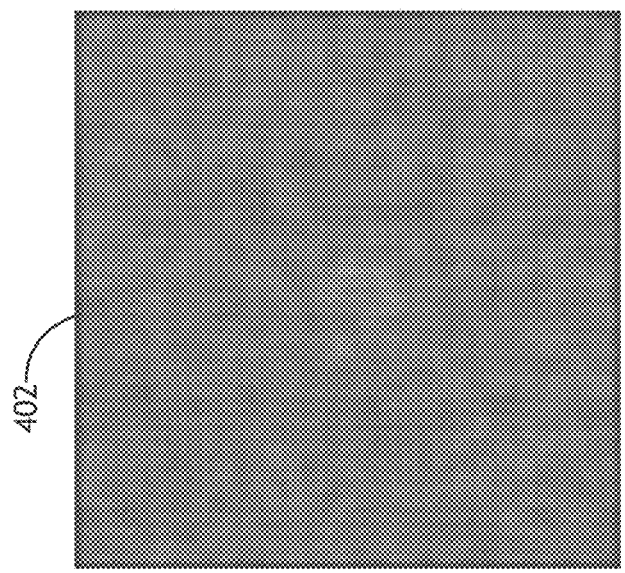

FIG. 4A illustrates the enhancement of pixels associated with a defect, in accordance with one or more embodiments of the present disclosure. As shown in picture 402, the defective pixels of flat-pattern defects may be embedded in repeated pattern noises or texture structure noises. As shown in picture 404, the combination of downsampling using bicubic or bilinear interpolation and the frequency domain low pass filtering enhances the signal of the defective pixels.

Figure 4B:
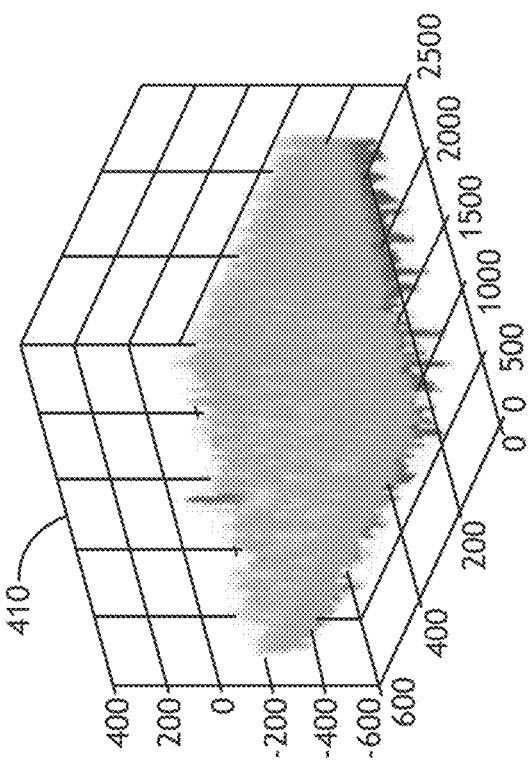
FIG. 4B are surface plots illustrating the enhancement of pixels associated with a defect, in accordance with one or more embodiments of the present disclosure.
Figure 4B:
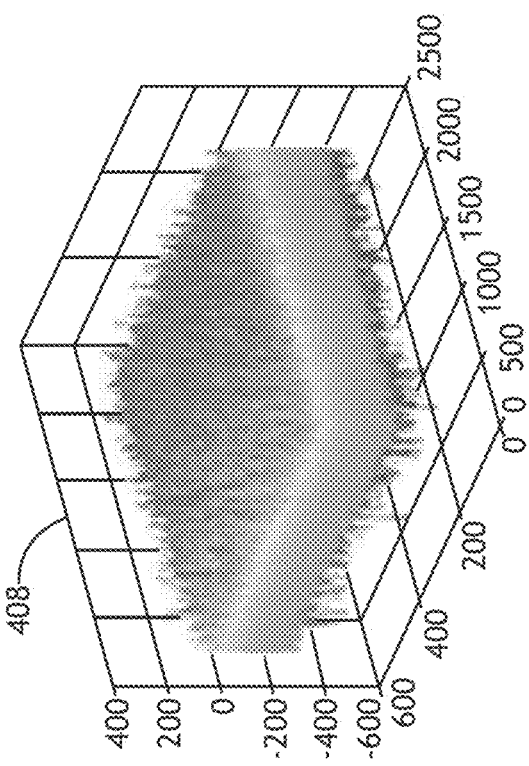

FIG. 4B are surface plots illustrating the enhancement of pixels associated with a defect, in accordance with one or more embodiments of the present disclosure. The surface plot 408 shows the original defect of interest (DOI). The surface plot 410 shows the enhancement of the SNR of defect pixels from 1.32 to 3.27 after the combination of downsampling and frequency domain LPF.

Figure 5:
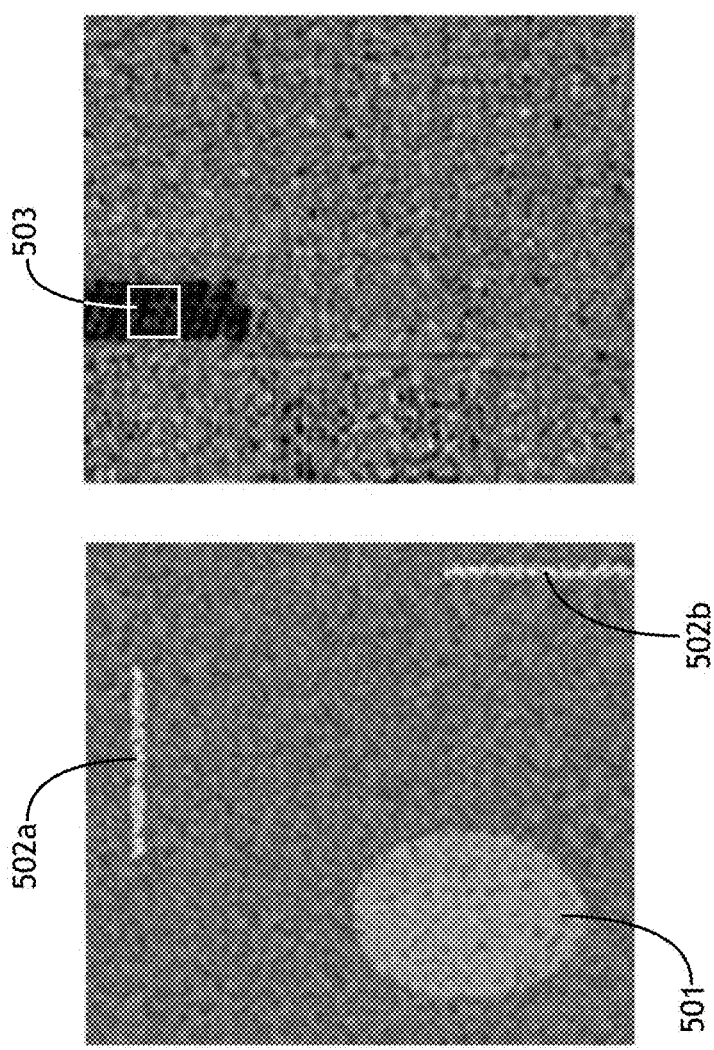
FIG. 5 illustrates examples of flat pattern defects, in accordance with one or more embodiments of the present disclosure.

FIG. 5 shows a flat pattern defect 501 and two types of color nuisances: (a) a horizontal stripe 502a and a vertical stripe 502b, and (b) a rectangular-like shape 503. The shape features (e.g., eccentricity) may be effectively used to remove or reduce the nuisances 502a, 502b, and 503. The exact number of defective pixels may be computed using defective pixel segmentation and image labeling and counting. Additionally, the corresponding sizes of the bounding-boxes of defective regions may be computed.

Referring to FIG. 3 again, in step 303, the signal-enhanced images may be binarized by calculating the average pixel gray-level values (mValue) and the standard deviation pixel gray-level values (sValue) for every pixel. Segmentation may be determined using a threshold of mValue+sValue*sigma for the white pixels of DOIs and a threshold of mValue−sValue*sigma for the dark pixels of DOIs. It is noted that the sigma value may be adjusted by a user. Conventional noise collection and defective pixel detection techniques may be used to determine the defect pixels. The combined denoising and filtering may improve the detectability of flat pattern defects of relatively weak signals, and may produce some color nuisances. Based on selected shape features, color nuisances caused by a filtering process may be reduced and eliminated effectively and efficiently. In a single-die detection mode, low-frequency wave or line noise patterns may be difficult to filter. To solve this issue, a notch filter (i.e., a band-stop filter) in the frequency domain may be combined with the low-pass filter.

In step 304, after candidate defective pixels are computed, holes in defective regions may be filled using a morphological reconstruction.

In step 305, small isolated defective blobs may be removed based on size after the candidate blobs are labeled. A size threshold may be defined by a user such that blobs below a certain size are removed.

In step 306, shape features such as area, bounding box, major axis length and minor axis length of a fitted ellipse, and an eccentricity may be computed. The eccentricity may be the ratio of the distance between the foci of the ellipse and the major axis length of the ellipse. The eccentricity of a circle is 0, and the eccentricity of a line segment is 1. To remove line-like nuisances, a value between 0 and 1 may be selected.

In step 307, nuisance blobs may be filtered based on the shape features. In step 308, flat pattern defects may be isolated and identified with the number of defective pixels using image component labeling. If one flat-pattern defect is labeled, the exact number of defect pixels may be counted accurately. If more than the one flat-pattern defect is labeled, the number of defective pixels may be approximated using a rectangle bounding-box method.

The method 300 may enable efficient detection of flat remain defects, residue defects, and stain defects with a high accuracy and a low nuisance rate in either a die-to-die difference detection mode or a single-die detection mode. The combination of downsampling and LPF filtering may amplify discrete defective pixels scattered across an image for sequential detection. In addition to the present method, conventional algorithms may be employed. The conventional algorithms in the context of laser-scanning (LS) systems may include difference-image based statistical analysis that entail preprocessing, noise collection, and the determination of defective pixels.

The method 300 may be superior to conventional pixel-level intensity-based SNR inspection algorithms or cell-to-cell based single-die techniques in both the die-to-die difference detection mode and the single-die detection mode. In the single-die detection mode, the registration effect is negligible and color nuisance generated from registration is not a critical issue. Nuisance filtering based on shape features may be utilized in both operation modes. If detected defective pixels overlap in the original image, the detected defective pixels may accurately locate defective pixel signatures in the original image.

The downsampling process may use bicubic or bilinear interpolation to remove undesirable pixels and may form more representable condensed candidate defective regions. The subsequent low-pass filter in the frequency domain may further enhance signals for easy detection. The SNR of defective pixels may be increased, for example, from 1.32 to 3.27. The downsampling using bicubic or bilinear interpolation is simple, generally applicable, and easy to implement. Additionally, there are many efficiently implemented libraries (e.g., implemented in the C programming language) for low-pass filtering in the frequency domain, such as the Fastest Fourier Transform in the West (FFTW) library.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
   a controller communicatively couplable to an inspection sub-system, wherein the inspection sub-system is configured to receive illumination from a sample and generate image data, wherein the controller includes one or more processors configured to execute program instructions causing the one or more processors to:
   receive the image data, wherein the image data comprises at least one image;
   downsample the at least one image using bicubic interpolation or bilinear interpolation;
   transform the at least one image from a spatial domain to a frequency domain using a Fourier transform;
   filter frequencies higher than a threshold frequency from the at least one image;
   transform the at least one image from the frequency domain to the spatial domain using an inverse Fourier transform; and
   detect one or more flat-pattern defects in the at least one image.

2. The system of claim 1, wherein the sample comprises at least one of a semiconductor wafer, a reticle, or a photomask.

3. The system of claim 1, wherein the one or more flat-pattern defects comprise:
   at least one of remain defects, residue defects, or stain defects.

4. The system of claim 1, wherein the one or more processors are further configured to execute program instructions causing the one or more processors to:
   apply at least one of a Butterworth filter function or a Gaussian filter function to the at least one image.

5. The system of claim 1, wherein the one or more processors are further configured to execute program instructions causing the one or more processors to:
   calculate average pixel gray-level values and standard deviation pixel gray-level values of the at least one image.

6. The system of claim 5, wherein the one or more processors are further configured to execute program instructions causing the one or more processors to:
   binarize each pixel of the at least one image using the average pixel gray-level values and the standard deviation pixel gray-level values.

7. The system of claim 1, wherein the one or more processors are further configured to execute program instructions causing the one or more processors to:
   multiply the at least one image with a filter kernel.

8. An inspection system comprising:
   an inspection sub-system; and
   a controller communicatively couplable to the inspection sub-system, wherein the inspection sub-system is configured to receive illumination from a sample and generate image data, wherein the controller includes one or more processors configured to execute program instructions causing the one or more processors to:
   receive the image data, wherein the image data comprises at least one image;
   downsample the at least one image using bicubic interpolation or bilinear interpolation;
   transform the at least one image from a spatial domain to a frequency domain using a Fourier transform;
   filter frequencies higher than a threshold frequency from the at least one image;
   transform the at least one image from the frequency domain to the spatial domain using an inverse Fourier transform; and
   detect one or more flat-pattern defects in the at least one image.

9. The system of claim 8, wherein the sample comprises at least one of a semiconductor wafer, a reticle, or a photomask.

10. The system of claim 8, wherein the one or more flat-pattern defects comprise:
    at least one of remain defects, residue defects, or stain defects.

11. The system of claim 8, wherein the one or more processors are further configured to execute program instructions causing the one or more processors to:
    apply at least one of a Butterworth filter function or a Gaussian filter function to the at least one image.

12. The system of claim 8, wherein the one or more processors are further configured to execute program instructions causing the one or more processors to:
    calculate average pixel gray-level values and standard deviation pixel gray-level values of the at least one image.

13. The system of claim 12, wherein the one or more processors are further configured to execute program instructions causing the one or more processors to:
    binarize each pixel of the at least one image using the average pixel gray-level values and the standard deviation pixel gray-level values.

14. An inspection method comprising:
    receiving illumination from a sample and generating image data using an inspection sub-system,
    receiving the image data, wherein the image data comprises at least one image;
    downsampling the at least one image using bicubic interpolation or bilinear interpolation;
    transforming the at least one image from a spatial domain to a frequency domain using a Fourier transform;

filtering frequencies higher than a threshold frequency from the at least one image;

transforming the at least one image from the frequency domain to the spatial domain using an inverse Fourier transform; and detecting one or more flat-pattern defects in the at least one image.

15. The method of claim 14, wherein the sample comprises at least one of a semiconductor wafer, a reticle, or a photomask.

16. The method of claim 14, wherein the one or more flat-pattern defects comprise:

at least one of remain defects, residue defects, or stain defects.

17. The method of claim 14, comprising applying at least one of a Butterworth filter function or a Gaussian filter function to the at least one image.

18. The method of claim 14, comprising calculating average pixel gray-level values and standard deviation pixel gray-level values of the at least one image.

19. The method of claim 18, comprising binarizing each pixel of the at least one image using the average pixel gray-level values and the standard deviation pixel gray-level values.

20. The method of claim 8, comprising multiplying the at least one image with a filter kernel.

* * * * *